G. J. Silvestri
INVENTOR.

Sept. 26, 1967  G. J. SILVESTRI  3,343,427
ELECTRO-MECHANICAL LINEAR MOTION ACTUATOR
Filed Jan. 4, 1966  2 Sheets-Sheet 2

G. J. Silvestri
INVENTOR.

BY

AGENT.

United States Patent Office 3,343,427
Patented Sept. 26, 1967

3,343,427
ELECTRO-MECHANICAL LINEAR MOTION ACTUATOR
Giovanni J. Silvestri, Barrington, R.I., assignor to the United States of America as represented by the Secretary of the Navy.
Filed Jan. 4, 1966, Ser. No. 518,743
6 Claims. (Cl. 74—424.8)

The invention described herein may be manufactured and used by or for the Government of the United States of America for governmental purposes without the payment of any royalties thereon or therefor.

This invention relates generally to linear motion actuator mechanisms, and more particularly to a mechanism which allows the power of a continuously rotating shaft to be intermittently applied directly as a linear force to produce linear motions of a reciprocating kind.

Rotating to intermittent and incremental linear motion conversion mechanisms have many diverse applications in the machine element arts. One such application, for example, is as a positioning device for machine tools. This particular invention, while readily adaptable to many other uses, resulted from a need for a simple, reliable mechanism to drive torpedo hydrodynamic control surfaces utilizing the torpedo propulsion shaft as a power source. In the past, a number of devices have been used to actuate torpedo control surfaces. These included large solenoid driven rods moving through extremes of the working stroke, electro-magnetic particle clutches to actuate control rods driven by propeller shaft power, and mechanisms for converting shaft power to hydraulic pressure which is used to drive linear hydraulic motors through electrical servo valves. Although, in general, these devices have performed satisfactorily, they have not been found to be entirely suitable in certain applications for the reason that most of these devices are bulky, heavy and highly complex requiring considerable skill in their manufacture. Many are noisy and exhibit low force generation characteristics. Some require extremely clean environments.

It is therefore an object of the present invention to provide an electro-mechanically actuated linear motion actuator which is powered directly from a continuously rotating shaft.

It is another object of this invention to provide a simple, reliable intermittently actuated rotation to linear motion conversion mechanism which has fast response and generates sizable forces to produce precise incremental motion.

It is a further object of the invention to provide a device for converting rotational mechanical forces to linear motions of a reciprocating kind which requires low power to operate, is highly efficient, and is relatively inexpensive and simple to manufacture.

According to the present invention, the foregoing and other objects are attained by providing a nut and screw gear mechanism which is driven through two spring clutches by a continuously rotating shaft. The nut and screw normally rotate together resulting in no linear motion as defined by translation of the screw. Either the nut or the screw can be prevented from rotating by appropriate clutch action to obtain the desired sense of linear motion. Actuation of the clutches is achieved through the use of electro-mechanically operated brake mechanisms which selectively lock the clutch springs against rotation.

The specific nature of the invention, as well as other objects, aspects, uses and advantages thereof, will clearly appear from the following description and from the accompanying drawing, in which.

Figure 1:
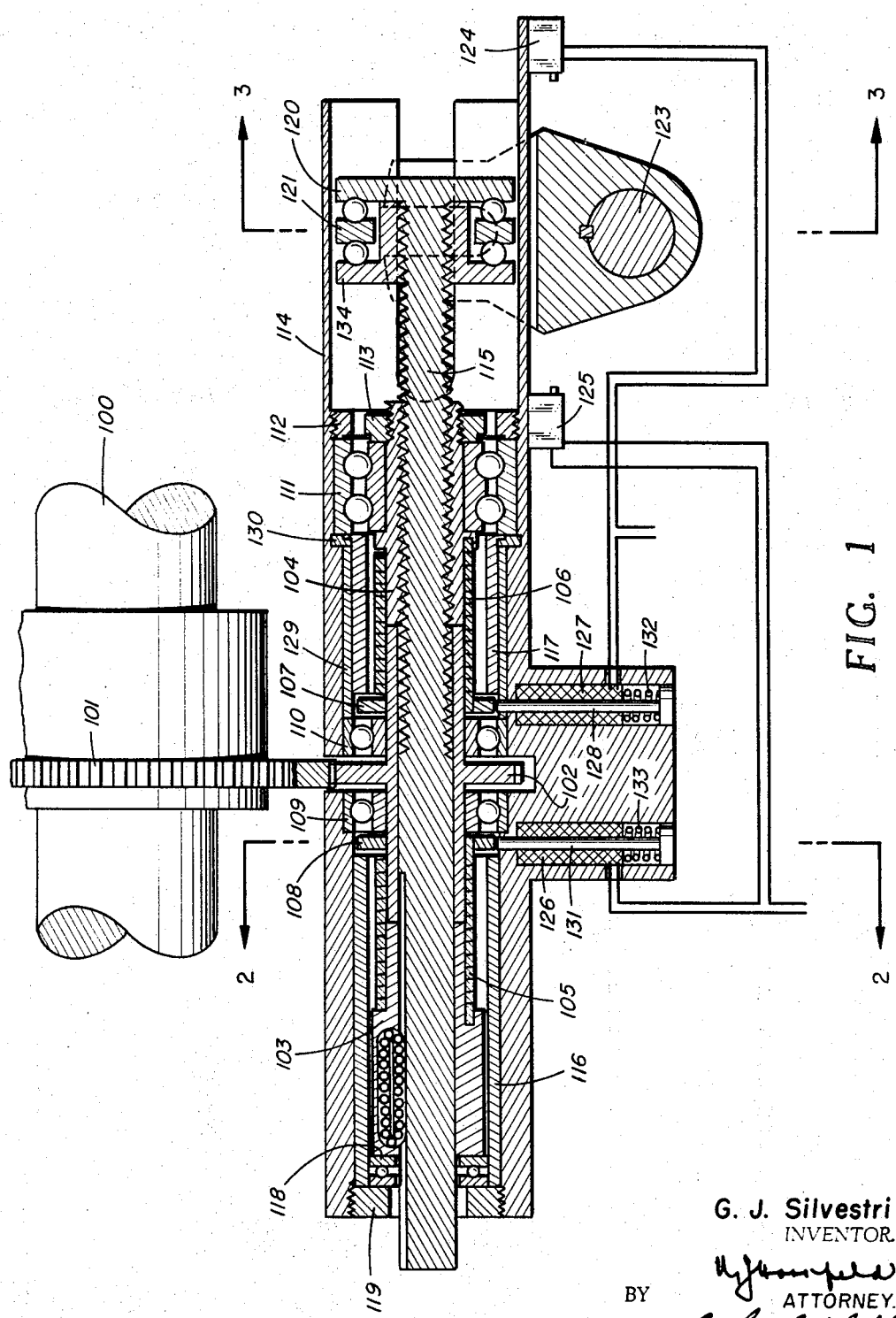
FIG. 1 is a cross-sectional view taken along the longitudinal axis of a preferred embodiment of the invention.
Figure 2:
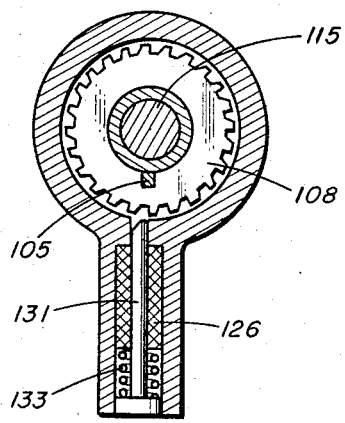
FIG. 2 is a cross-sectional view taken along section lines 2—2 in FIG. 1.
Figure 3:
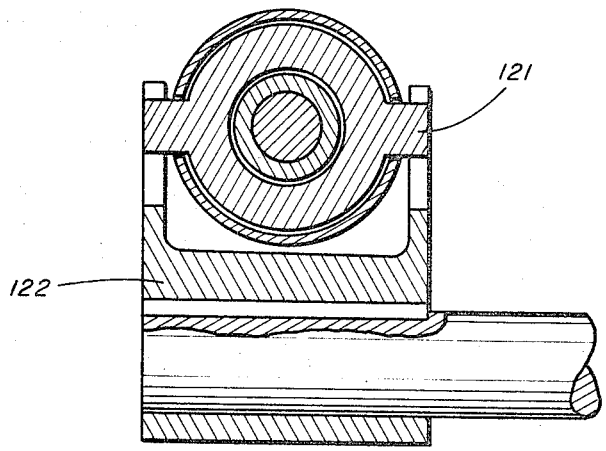
FIG. 3 is a cross-sectional view taken along section lines 3—3 in FIG. 1.

Referring now to the drawing wherein like reference numerals designate identical parts throughout the several views, there is shown a rotating shaft 100 which may be the main propeller shaft in a torpedo, for example. Power driving gear 101 is secured to shaft 100 and engages power takeoff gear 102. Gear 102 is provided with long outwardly extending hubs on either side thereof which pass through and frictionally engage the respective inner races of ball bearings 109 and 110. Bearings 109 and 110, which axially constrain as well as support gear 102, are themselves supported within a hollow cylindrical housing 114 which is open at either end. The inner surface of housing 114 is formed by three bores of progressively increasing diameter thus forming two shoulders. In assembling the actuator, the subassembly comprising ball bearing 109, gear 102 and ball bearing 110 are inserted into housing 114 so that the outwardly exposed face of the outer race of bearing 109 comes into abutting contact with the shoulder between the small and intermediate diameter bores. The outer races of both bearings 109 and 110 frictionally engage the intermediate diameter bore surface. The subassembly is held in position and constrained from axial movement by sleeve 129 which is slid into housing 114 and makes abutting engagement with the outwardly exposed face of the outer race of bearing 110. The outer surface of sleeve 129 makes frictional contact with the intermediate bore surface within housing 114, sleeve 129 itself extending just to the shoulder between the intermediate and large diameter bore surfaces. Finally, a spacing washer or retaining nut 130 is slid into abutment with the outwardly exposed end of sleeve 129 and the shoulder between the intermediate and large diameter bore surfaces. As is clearly shown in the drawing in FIG. 1, housing 114 is, in fact, comprised of two pieces axially aligned with one another and held in spaced apart relation to form an axial slot through which power takeoff gear 102 projects.

A plain or recirculating ball spline hub 103 engages the spline end of a screw 115 which slideably passes through the hubs of gear 102. Two sprocket wheels 107 and 108 riding on respective hubs of gear 102 are provided with keyways. An outwardly projecting end of lefthand helical clutch spring 105 is engaged by the keyway in sprocket wheel 108. Clutch spring 105 overlaps and is in frictional contact with the hub of gear 102 on which wheel 108 rides and a portion of spline hub 103, the other end thereof being fixedly attached to hub 103 as by a keyway or slot. Sleeve 116, the outer surface of which is in frictional contact with the small diameter bore inner surface of housing 114, encloses clutch spring 105. Spline hub 103 acts against thrust bearing 118 which is retained in housing 114 by nut 119. An outwardly projecting end of righthand helical clutch spring 106 is engaged by the keyway in sprocket wheel 107. The other end of spring 106 is secured to nut 104 which is threaded to screw 115. Clutch spring 106 overlaps and is in frictional contact with a portion of nut 104 and the hub of gear 102 on which sprocket wheel 107 rides. Sleeve 117, which has a flange at one end that keys to retaining nut 130 thereby providing a cantilever support for the sleeve, encloses clutch spring 106. Nut 104 is axially restrained by a preloaded, double-race ball bearing 111 and retaining nuts 112 and 113. The inner race of bearing 111 is in frictional contact with nut 104, while the outer race is in frictional contact with the large diameter portion of the inner surface of housing 114. The outer race abuts retaining nut 130 and is retained axially by nut 112 which is threaded into the inner surface of housing 114. The inner race is retained by nut 113 which is threaded onto nut 104.

Two solenoids 126 and 127 rigidly mounted on the outside of housing 114 actuate two palls 131 and 128, respectively. Palls 128 and 131 engage sprocket wheels 107 and 108, respectively, when solenoids 127 and 126, respectively, are energized. Each of solenoids 126 and 127 is provided with return springs 133 and 132, respectively, which act to bias their respective palls 128 and 131 out of engagement with the sprocket wheels 107 and 108.

A double thrust ball bearing arrangement is provided at the threaded end of screw 115 to facilitate coupling the translational movement of screw 115 to the shaft 123 of a hydrodynamic control surface, for example. This bearing arrangement includes a first race 120 which may be threaded onto the end of screw 115 or, alternatively, may be in the form of an outwardly projecting flange integral with the end of screw 115. A second race 134 is threaded onto screw 115. A center, circular member 121 having trunnions is positioned between races 120 and 134 and acts as a center race for the two sets of balls in the bearing. The trunnions on member 121 pass through corresponding longitudinal slots in housing 114 and engage yoke 122, which is keyed to shaft 123. Two normally "on" limit switches 124 and 125 are positioned on either side of yoke 122 and are actuated thereby at the extreme limits of its motion. Limit switch 124 is connected in series with solenoid 126 and a source of actuating signals (not shown). In similar manner, limit switch 125 is connected in series with solenoid 127 and another source of actuating signals (not shown).

In operation, rotary motion of power gear 101 is imparted to takeoff gear 102 which, it is assumed for purposes of this description, rotates in the clockwise direction. Friction between the respective hubs of gear 102 and clutch springs 105 and 106 causes the springs to tightly contract about and engage the hubs. The rotary motion of gear 102 is thus transmitted to spline hub 103 and nut 104. Rotation of hub 103 causes screw 115 to rotate, and since both screw 115 and nut 104 are rotating together, screw 115 has no axial motion. Upon energization of solenoid 126, for example, pall 131 is actuated into engagement with sprocket wheel 108 thereby preventing rotary motion of clutch spring 105. Spring 105 expands, releasing the hub of gear 102 which continues to rotate. Sleeve 116 limits the radial expansion of clutch spring 105. Spline hub 103 is thus locked against rotation preventing screw 115 from rotating. Nut 104, which continues to be driven by clutch spring 106, screws clockwise on screw 115 thereby moving screw 115 linearly to the left. When solenoid 126 is de-energized, spring 133 causes pall 131 to disengage sprocket wheel 108. Clutch spring 105 reengages the hub of gear 102, transmitting rotational motion to spline hub 103 and screw 115 once again. Linear motion of screw 115 then ceases. Motion in the opposite direction is obtained by energizing solenoid 127. This causes pall 128 to engage sprocket wheel 107 thereby disengaging clutch spring 106 from the hub of gear 102 and locking nut 104 against rotation. Screw 115, however, continues to rotate and screws clockwise into nut 104 thus causing it to advance to the right.

The translational force of screw 115 is applied as a force against yoke 122. This produces a moment about the center of shaft 123 causing it to rotate in one direction or the other. Limit switches 124 and 125 prevent over travel of screw 115. For example, if screw 115 attains its maximum displacement to the right, yoke 122 actuates switch 124 which breaks the circuit to solenoid 127 causing it to become deenergized.

The mechanism thus described utilizes shaft power directly without the need for energy conversion systems such as hydraulic pumps and linear motors. The need for piping, the danger of hydraulic fluid leaks, the need for very fine hydraulic filters, and the problem of hydraulic pump noises have therefore been eliminated. In addition, the mechanism can be made smaller than other electrically actuated clutch type systems since only small actuation forces are required. At the same time the power available for actuating an output member or device is limited only by the power of the main drive shaft.

It should be understood, of course, that the foregoing disclosure relates to only a preferred embodiment of the invention and that numerous modifications or alterations may be made therein without departing from the spirit and the scope of the invention as set forth in the appended claims. For example, the bearings employed may be a hydrodynamic type instead of the rolling friction type described. The trunnion and yoke mechanism may be replaced by any other member requiring linear actuation. A pivot may be provided on housing 114 at the center of take-off gear 102 which would allow limited angular motion of the mechanism. Such a provision would require that gear 102 have crown teeth. The solenoid, pall, and sprocket wheel assemblies may be replaced by any braking mechanism operative to lock the respective clutch spring ends against rotation and may include a caliper, cylinder, or band type brakes.

I claim as my invention:

1. A linear motion actuator which allows the power of a continuously rotating shaft to be intermittently applied directly as a linear force to produce linear motions of a reciprocating kind comprising power takeoff means for engaging said continuously rotating shaft, a nut and screw gear mechanism, a first clutch spring having one end operatively attached to said screw, said first clutch spring frictionally engaging said power takeoff means to provide a transmission path for the rotational motion of said continuously rotating shaft to said screw, a second clutch spring having one end fixedly attached to said nut, said second clutch spring frictionally engaging said power takeoff means to provide a transmission path for the rotational motion of said continuously rotating shaft to said nut, first braking means connected to the other end of said first clutch spring operative upon actuation for disengaging said first clutch spring from said power takeoff means to thereby lock said screw against rotation, second braking means connected to the other end of said second clutch spring operative upon actuation for disengaging said second clutch spring from said power takeoff means to thereby lock said nut against rotation, and electrical actuation means connected to said first and second braking means for selectively actuating said first and second braking means whereby said screw is made to translate in one direction by said nut threading onto said screw while said screw is locked against rotation and said screw is made to translate in the opposite direction by screwing into said nut while said nut is locked against rotation, there being no translational movement of said screw while said screw and said nut are rotating together.

2. A linear motion actuator as recited in claim 1 wherein one end of said screw is splined, said actuator further comprising a spline hub engaging the spline end of said screw, said one end of said first clutch spring being directly attached to said spline hub.

3. A linear motion actuator as recited in claim 2 further comprising first and second sleeves enclosing said first and second clutch springs, respectively, said sleeves acting to limit the radial expansion of said clutch springs when disengaged from said power takeoff means by actuation of a respective one of said first or second braking means.

4. A linear motion actuator as recited in claim 3 wherein said first and second braking means include first and second sprocket wheels normally free to rotate with said power takeoff means, said other end of said first clutch spring being fixedly attached to said first sprocket wheel and said other end of said second clutch spring being fixedly attached to said second sprocket wheel, first and second palls movable to engage or disengage said first and second sprocket wheels, respectively, to thereby prevent or permit the free rotation of said first and second sprocket wheels, and first and second electrical solenoids actuating said first and second palls when energized by an actuating signal to move said first and second palls into engagement with said first and second sprocket wheels, respectively.

5. A linear motion actuator as recited in claim 4 further comprising a first limit switch connected in series with said first solenoid and actuated at a predetermined maximum translation of said screw in said one direction to break the circuit to said first solenoid thereby deenergizing said first solenoid, and a second limit switch connected in series with said second solenoid and actuated at a predetermined maximum translation of said screw in said other direction to break the circuit to said second solenoid thereby deenergizing said second solenoid.

6. A linear motion actuator as recited in claim 5 further comprising a nonrotating trunnion on said screw fixed longitudinally therealong, an output shaft, and a yoke member rigidly connected to said output shaft and engaging said trunnion whereby said output shaft is rotated through an angle due to the translational movement of said screw.

References Cited
UNITED STATES PATENTS

| | | | |
|---|---|---|---|
| 2,872,828 | 2/1959 | Brogdon | 192—41 X |
| 3,008,558 | 11/1961 | Bennett et al. | 74—388 X |
| 3,029,659 | 4/1962 | Geyer | 74—388 X |
| 3,221,118 | 11/1965 | Hoover | 74—424.8 X |
| 3,256,542 | 6/1966 | Schubert | 74—424.8 X |

DONLEY J. STOCKING, *Primary Examiner.*

L. H. GERIN, *Assistant Examiner.*